June 24, 1924.
C. W. ACKERSON
TRAFFIC SIGNAL
Filed April 15, 1921
1,498,943
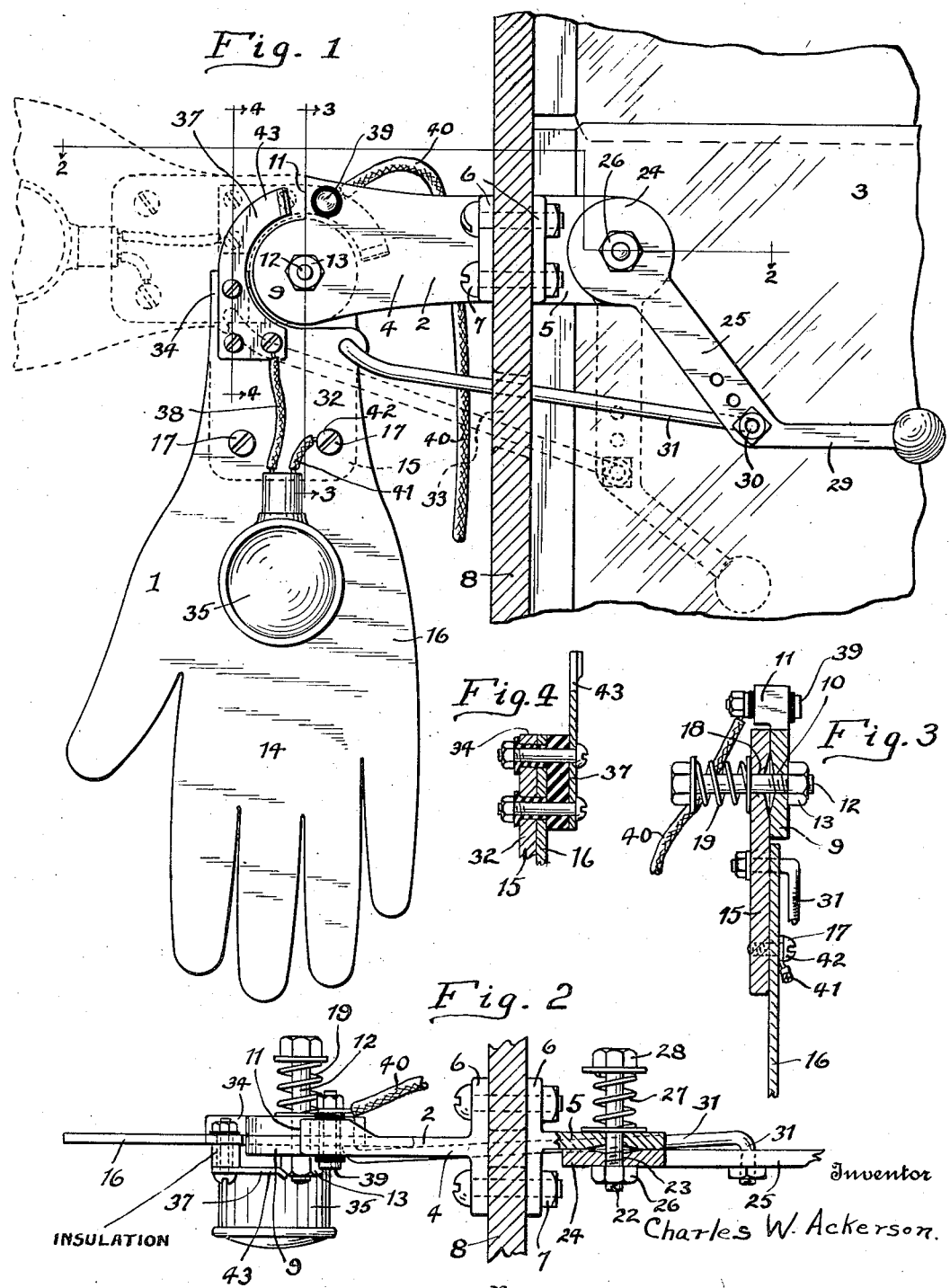
Inventor
Charles W. Ackerson.
By C. C. Shepherd
Attorney Patented June 24, 1924.

1,498,943

UNITED STATES PATENT OFFICE.

CHARLES W. ACKERSON, OF WESTERVILLE, OHIO.

TRAFFIC SIGNAL.

Application filed April 15, 1921. Serial No. 461,738.

*To all whom it may concern:*

Be it known that CHARLES W. ACKERSON, a citizen of the United States, residing at Westerville, in the county of Franklin and State of Ohio, has invented certain new and useful Improvements in Traffic Signals, of which the following is a specification.

This invention relates to an improved traffic signal, and has particular reference to signals of the type employed in connection with motor vehicles for the purpose of denoting the contemplated movements of a vehicle, in order that those adjacent to the vehicle will be enabled to direct their courses so as to avoid undue conflict with a vehicle equipped with the signal.

A primary object of the invention resides in the provision of a signal of this character wherein is provided a fixed, laterally extending vehicle carried bracket structure, to the outer end of which is pivotally mounted a signalling hand, arm or semaphore, the inner end of said bracket structure being provided with a pivotally connected manually operable handle, and in the provision of a connecting link between the said signalling hand and operating lever, the said link serving, upon the operation of the lever, to oscillate the handle so as to cause the latter to assume various signalling positions.

A further object of the invention rests in providing spring operated pivotal mountings between the bracket structure, the signalling hand and the operating lever, the purpose of which mounting being to retain the said hand and lever in set positions of adjustment with respect to the bracket structure, and also to eliminate vibration and rattle between the relatively movable parts.

With these and other objects in view, as will appear as the description proceeds, the invention accordingly consists in the novel features of construction, combinations of elements and arrangements of parts, hereinafter to be fully described and pointed out in the appended claim.

In the accompanying drawing, forming a part of this specification, and in which similar characters of reference denote like and corresponding parts throughout the several views thereof:

Figure 1 is a side elevation of the improved traffic signal comprising the present invention, and illustrating the application thereof to the body of a motor vehicle, Figure 2 is a horizontal sectional view taken on the line 2—2 of Figure 1, Figure 3 is a vertical sectional view taken on the line 3—3 of Figure 1, and Figure 4 is a similar view taken on the plane disclosed by the line 4—4 of Figure 1.

Referring more particularly to the details of the invention, the numeral 1 designates my improved traffic signal in its entirety. In its preferred use the signal 1 is adapted to be employed in connection with a motor vehicle for the purpose of denoting and giving warning to adjacent persons of the intended movements of said vehicle. To this end, the signal includes a bracket structure 2, which in this instance is of the type employed when the signal is mounted upon a motor vehicle having a closed or glass encased body, the said bracket structure being preferably mounted on said body contiguous to the windshield 3 thereof.

The bracket structure for this type of vehicle comprises an outer section 4 and an inner section 5, the said sections being formed to include laterally offset base portions 6, which are bolted or otherwise rigidly connected as at 7 to one of the frame posts 8 of the vehicle body. This construction enables the bracket structure to be rigidly mounted so as to project transversely of the vehicle.

The outer section 4 terminates in a substantially circular ear 9, which is provided with an axial aperture 10 and with a vertically offset shoulder 11, the aperture 10 being adapted to receive the threaded end of a horizontally located screw or bolt 12, which is capable of being rigidly locked by means of a nut 13. Arranged to rotate about the axis provided by the bolt 12 is a signalling hand, arm or semaphore 14, which in this instance is formed to include a metallic supporting plate 15 and a relatively thin signalling section 16, the parts 15 and 16 being rigidly united by means of screws 17. The bolt 12 projects loosely through the opening 18 formed in the plate 15 and therefore provides a support about which the hand 14 may pivotally rotate. The said bolt projects laterally beyond one side of the plate 15 and has its shank provided with an encircling coil spring 19, one end of the latter being disposed to press against the head of the bolt 12 and the other end to press against the plate 15, in order that the latter may in turn be frictionally forced into engagement with one side of the ear 9. This construction, as will be clearly understood, serves to provide a pivotal mounting for the hand 14 and also serves to maintain said hand in its various positions of relative adjustment with respect to the bracket structure. Moreover, vibration or chatter between these relatively movable parts, when the vehicle is in operation, is effectively precluded.

In order to effect the oscillation of the hand 14, the inner section 5 of the bracket structure is provided with an aperture through which the shank of a laterally extending bolt projects, the said bolt being provided with a threaded end 22, which is adapted to be received within a threaded opening 23 provided in the circular upper end 24 of an operating lever 25, the end 22 being equipped with a lock nut 26 for retaining the bolt against movement. Surrounding the bolt 21 is a coil spring 27, which is confined between the head 28 of the bolt 21 and the bracket section 5. Obviously, by this construction the lever 25 may be freely oscillated and yet may be retained in its various positions of adjustment, so as to be free from vibration and to overcome accidental displacement thereof. The said lever includes an angular handle portion 29, which is situated so as to extend downwardly and inwardly of the vehicle, and is located to one side of the windshield 3 at a position contiguous to the steering wheel, not shown, of the vehicle. By so mounting the said lever, the same may be conveniently reached by the operator of the vehicle and also will furnish no obstruction to a clear vision through the windshield 3.

Connected as at 30 with the handle 29 is a link 31, which serves to unite the lever 25 with the upper end 32 of the signalling section 16 of the hand 14, the said link 31 being disposed to pass through an opening 33 formed in the frame post 8. Manifestly, by virtue of the construction described, the oscillation of the lever 25 will result in imparting motion to the signalling hand 14 so that the latter may be raised or lowered at the will of the vehicle operator. It will be observed that the link 31 is connected with the lever 25 and the hand 14 in such manner, as regards the respective pivots thereof, that but slight oscillation on the part of the lever will result in causing considerable travel of the hand 14, a feature which is desirable because of the limited space provided for the swinging of the handle end of said lever. It will be observed that the upper end 32 of the signalling section 16 terminates in a curved projection 34, capable of surrounding the ear 9. The projection 34 is so located that when the signalling hand has been raised to assume the substantially horizontal position, as shown by dotted lines in Figure 1, the projection 34 will engage with the shoulder 11, limiting thereby further upward movement on the part of the hand. It will also be patent that the said signalling hand may be maintained in its various positions of adjustment by means of the spring actuated pivotal mountings described.

To enable the signal to be clearly visible at night, the hand 14 is provided with an incandescent lamp 35, which is suitably mounted so as to be securely held in connection with the hand. To energize the lamp 35, the end 32 of the hand section 16 is provided with a fixed arcuate contact member 37, which is suitably secured adjacent to the projection 34, a wire 38 leading from the contact member to the lamp 35. The outer section 4 of the bracket structure is provided with an insulated contact member 39, which is stationarily supported, and is capable of engaging with the movable member 37, a wire 40 being disposed to extend from the member 39 to a suitable point of current supply, and a wire 41 leads from the negative side of the lamp 35 to a ground terminal 42. Manifestly, by this construction when the signalling hand assumes the lowered inactive position disclosed in full lines in figure 1, the contact members 37 and 39 will be separated, thus causing the lamp 35 to be deenergized. However, when the lever 25 is actuated to elevate the hand, to its various signalling positions, engagement between the members 37 and 39 will be effected, thus completing the circuit so as to energize the lamp 35 and to effect the consequent illumination of the signal. It will be observed that the contact member 37 includes an elongated arcuate finger 43, which is disposed concentrically of the pivot bolt 12. By this arrangement and construction of the finger 43, the lamp 35 will be energized after the hand has been elevated but a relatively slight distance, and proper engagement between the contact members will be continually maintained while the said signalling hand is in any and all of its various elevated positions.

In view of the foregoing description, when taken in connection with the accompanying drawing, it will be apparent that the present invention provides a signal for the purpose stated which is of simple, positive and efficient construction, the relative arrangement of its parts being such as to admit of the convenient oscillation of the signalling hand 14 from the interior of the vehicle. Furthermore, by reason of the spring actuated pivotal mountings, the adjustment of the signalling hand may be effectively maintained and looseness or vibration between such relatively movable parts overcome. Another desirable feature rests in the automatic switch structure, which operates to secure the energizing of the lamp 35 over substantially the full arcuate travel of the signalling hand.

What is claimed is:

In a traffic signal, a bracket structure adapted for connection with the body of a motor vehicle, a signalling arm pivotally connected with the outer end of said bracket structure, resilient means operating to maintain said arm and bracket structure in close frictional relationship, an operating lever pivoted to the inner part of said bracket structure, resilient means serving to maintain said lever in close frictional engagement with said bracket structure, and a link connecting said arm with said lever, whereby upon the oscillation of the latter the said arm may be rotatably adjusted.

In testimony whereof I affix my signature.

CHARLES W. ACKERSON.